US011765199B2

(12) United States Patent
Talbot et al.

(10) Patent No.: US 11,765,199 B2
(45) Date of Patent: *Sep. 19, 2023

(54) COMPUTER-BASED SYSTEM FOR ANALYZING AND QUANTIFYING CYBER THREAT PATTERNS AND METHODS OF USE THEREOF

(71) Applicant: American Express Travel Related Services Co., Inc., New York, NY (US)

(72) Inventors: Douglas S. Talbot, New York, NY (US); Phillip Collett, Phoenix, AZ (US); Tony Durivaux, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,131

(22) Filed: Jun. 2, 2022

(65) Prior Publication Data

US 2022/0294819 A1 Sep. 15, 2022

Related U.S. Application Data

(63) Continuation of application No. 16/851,947, filed on Apr. 17, 2020, now Pat. No. 11,363,057.

(51) Int. Cl.
*H04L 9/40* (2022.01)
*H04L 41/22* (2022.01)

(52) U.S. Cl.
CPC .......... *H04L 63/1441* (2013.01); *H04L 41/22* (2013.01); *H04L 63/1416* (2013.01); *H04L 63/1425* (2013.01); *H04L 63/1433* (2013.01)

(58) Field of Classification Search
CPC ............ H04L 63/1441; H04L 63/1416; H04L 63/1425; H04L 63/1433
(Continued)

(56) References Cited

U.S. PATENT DOCUMENTS 5,781,109 A 7/1998 Nakajima
7,002,473 B2 2/2006 Glick et al.
(Continued)

FOREIGN PATENT DOCUMENTS

EP 2882159 A1 6/2015
KR 10-2019-0006934 A 1/2019

OTHER PUBLICATIONS

Datasheet Cytegic AGRO, "Automated Cyber Risk Officer (AGRO) Cytegic's End-to-End Solution for Cyber Risk Management" (2017).
(Continued)

*Primary Examiner* — Teshome Hailu
(74) *Attorney, Agent, or Firm* — Sterne, Kessler, Goldstein & Fox P.L.L.C.

(57) ABSTRACT

At least some embodiments are directed to a computer-based cyber-attack frequency tracking system that determines types and frequencies of cyber-attacks. In at least some embodiments, the method of a cyber-attack frequency tracking system may operate a processor in an enterprise computing environment for automatically conducting a process that comprises receiving, a plurality of data values that represent a plurality of cyber-attacks. Determining cyber-attack types, and then determining the frequency of attempts and contacts with assets. After that determining likelihood values. Aggregating these determinations to produce a quantifiable value of a likelihood values of each of the plurality of cyber-attack types.

20 Claims, 7 Drawing Sheets

(58) Field of Classification Search
USPC .......................................... 726/22, 23, 24, 25
See application file for complete search history.

(56) References Cited

U.S. PATENT DOCUMENTS

| | | | |
|---|---|---|---|
| 7,530,105 | B2 | 5/2009 | Gilbert et al. |
| 7,779,471 | B2* | 8/2010 | Balasubramaniyan ...................... H04L 63/1416 726/22 |
| 8,376,239 | B1 | 2/2013 | Humphrey |
| 8,479,296 | B2* | 7/2013 | Mashevsky ........... H04L 63/145 726/25 |
| 8,570,168 | B2 | 10/2013 | Logan et al. |
| 9,019,080 | B2 | 4/2015 | Centanni, Jr. et al. |
| 9,367,683 | B2 | 6/2016 | Kolacinski et al. |
| 9,426,169 | B2 | 8/2016 | Zandani |
| 10,649,794 | B2* | 5/2020 | Moon ................... G06N 20/00 |
| 2004/0230833 | A1* | 11/2004 | McCallam .......... H04L 63/1441 726/25 |
| 2006/0225133 | A1* | 10/2006 | Balasubramaniyan ...................... H04L 63/1416 726/22 |
| 2009/0119777 | A1* | 5/2009 | Jeon ...................... G06F 21/577 726/25 |
| 2012/0096549 | A1 | 4/2012 | Amini et al. |
| 2012/0174227 | A1* | 7/2012 | Mashevsky ........... G06F 21/562 726/24 |
| 2012/0322380 | A1 | 12/2012 | Nannarone et al. |
| 2013/0303502 | A1 | 11/2013 | Cavanagh et al. |
| 2014/0351929 | A1* | 11/2014 | Mahadevan ........ H04L 63/1408 726/22 |
| 2016/0006577 | A1 | 1/2016 | Logan |
| 2016/0189143 | A1 | 6/2016 | Koeppel |
| 2016/0191552 | A1* | 6/2016 | Yamada ............... H04L 63/1416 726/23 |
| 2017/0230391 | A1 | 8/2017 | Ferguson et al. |
| 2018/0034710 | A1* | 2/2018 | Allen .................. H04L 41/0896 |

OTHER PUBLICATIONS

Cytegetic COSS Product Datasheet, "Cyber Decision Support System" (2015).

Cytegetic CYMA Product Datasheet, "Cyber Maturity Assessment" (2015).

Cytegetic DYTA Product Datasheet, "Dynamic Trend Analysis" (2015).

* cited by examiner

COMPUTER-BASED SYSTEM FOR ANALYZING AND QUANTIFYING CYBER THREAT PATTERNS AND METHODS OF USE THEREOF

CROSS-REFERENCE TO RELATED APPLICATIONS

This patent application is a continuation of U.S. patent application Ser. No. 16/851,947, filed Apr. 17, 2020, which is incorporated by reference herein in its entirety.

BACKGROUND OF TECHNOLOGY

Typically, a computer system may include a group of computers (e.g., clients, servers, smart routers) and other computing hardware devices that are linked together through one or more communication channels to facilitate communication and/or resource-sharing, via one or more specifically programmed graphical user interfaces (GUIs), among a wide range of users.

Organizing and quantifying malicious or unsecure electronic activities of cyber-attacks can be a sometimes inaccurate, resource intensive, and complex problem.

SUMMARY OF DESCRIBED SUBJECT MATTER

In some embodiments, the present disclosure provides a method, at least having steps of automatically receiving, by a processor in an enterprise computing environment of an enterprise, a plurality of data values that represent numerous attempts of a plurality of cyber-attacks launched against a plurality of computing devices associated with the enterprise computing device and determining, by the processor, from the plurality of data values that represent the numerous attempts of the plurality of cyber-attacks: i) the cyber-attack type, ii) the frequency of attempts of the plurality of cyber-attacks, and iii) the frequency of contact of the plurality of cyber-attacks; and determining, by the processor, a cyber-attack event frequency value over the time period based at least in part on: i) the cyber-attack type, ii) the frequency of attempts of the plurality of cyber-attacks, and iii) the frequency of contact of the plurality of cyber-attacks.

The method further comprising continuously calculating, by the processor, in real-time, a cyber-attack event frequency half-life value, wherein the cyber-attack event frequency half-life value is a time period for the cyber-attack event frequency value to decrease by half; causing, by the processor, to present a visual cyber-attack representation for each cyber-attack type to show the cyber-attack event frequency half-life value of each cyber-attack type as a function of time on a display device; and continuously updating, by the processor, in real-time, the visual cyber-attack representation for each cyber-attack type.

In some embodiments, the present disclosure provides a system comprising: an enterprise computing environment having a processor; and memory storing instructions which, when executed by the processor, causes the processors to: automatically receive a plurality of data values that represent numerous attempts of a plurality of cyber-attacks launched against a plurality of computing devices associated with the enterprise; determine, from the plurality of data values that represent the numerous attempts of the plurality of cyber-attacks: i) a cyber-attack type, ii) a frequency of attempts of the plurality of cyber-attacks to target the enterprise computing environment of the enterprise during a time period, and iii) a frequency of contact of the plurality of cyber-attacks with the enterprise computing environment of the enterprise during the time period; and determine, a cyber-attack threat event frequency value of the plurality of cyber-attacks over the time period based at least in part on: i) the cyber-attack type, ii) the frequency of attempts of the plurality of cyber-attacks, and iii) the frequency of contact of the plurality of cyber-attacks.

The system wherein the instructions further cause the processor to calculate continuously, in real-time, a cyber-attack threat event frequency half-life value, wherein the cyber-attack threat event frequency half-life value is a time period for the cyber-attack threat event frequency value to decrease by a half; causing, by the processor, to present a visual cyber-attack representation for each cyber-attack type to show the cyber-attack event frequency half-life value of each cyber-attack type as a function of time on a display device; and continuously updating, by the processor, in real-time, the visual cyber-attack representation for each cyber-attack type.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
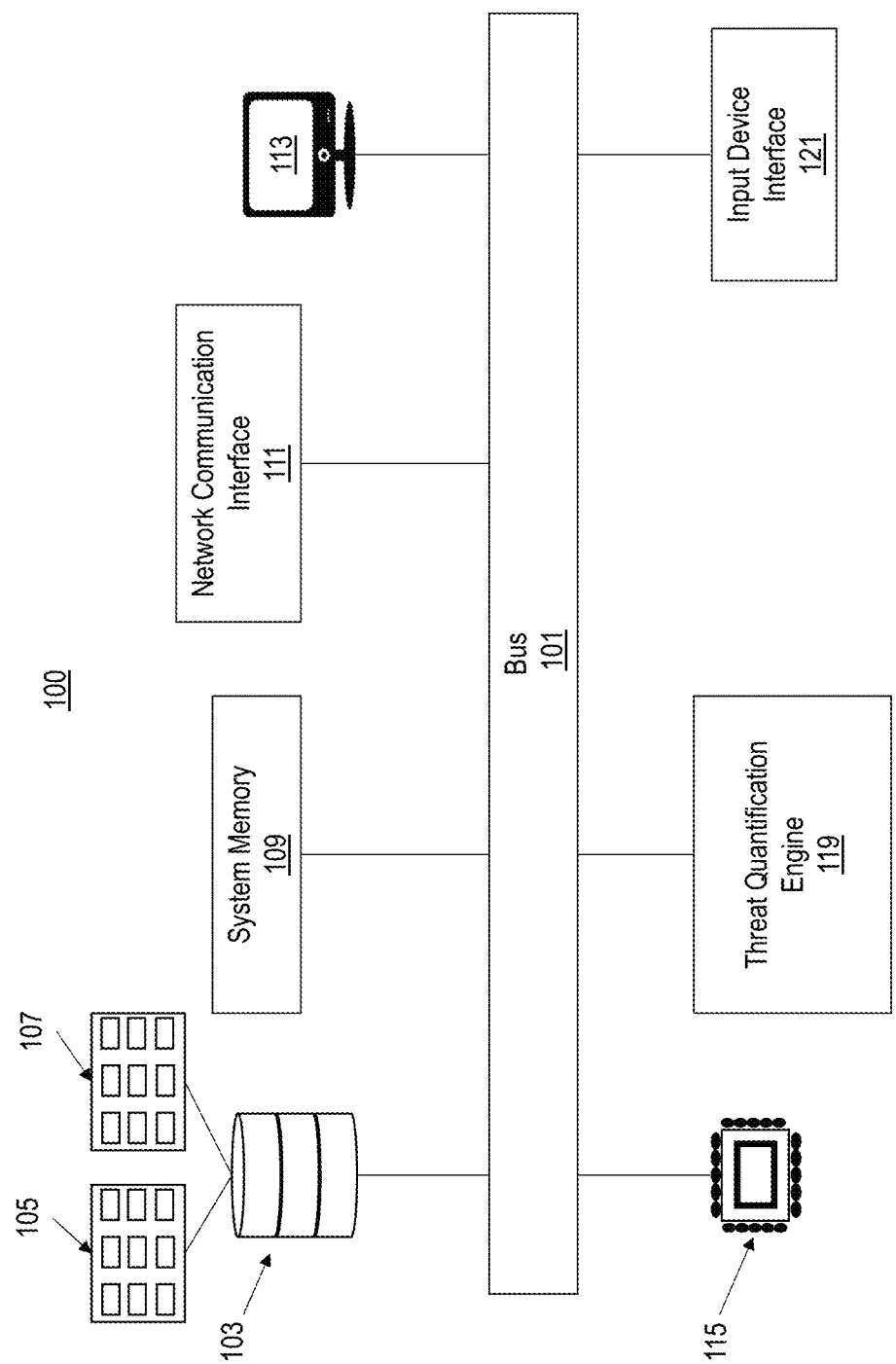
FIGS. 1-7 show one or more schematic flow diagrams, certain computer-based architectures, and/or screenshots of various specialized GUIs which are illustrative of some aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

As used and referenced herein, an "enterprise computing environment" is a computing architecture of an entity with numerous employees utilizing numerous computing devices connected to internal internet capabilities with numerous computing resources/systems, including one or more servers (e.g., enterprise servers (such as proxy servers, content servers, administrative servers, servers with the ability to manage enterprise-wide program) running numerous computer programs, and having one or more data centers. Enterprise computing environment encompasses all the various types of enterprise software, including but not limited to database management, accounting, inventory, resource management, streamlining process, and/or relationship management. Enterprise computing environment typically has applications standard across the system, while the application being used and the data being accessed in each area will be different.

As used and referenced herein, the term "cyber-attack" includes, without limitation any attempt to expose, alter, disable, destroy, steal or gain unauthorized access to or make unauthorized use of an asset in computers and computer networks. For example, a cyber-attack is any type of offensive maneuver that targets computer information systems, infrastructures, computer networks, or personal computer devices. An attacker is a person or process that attempts to access data, functions or other restricted areas of the system without authorization, potentially with malicious intent. Illustrative cyber-attacks may include one or more of the following consequences:

Identity theft, fraud, and extortion;
Malware, pharming, phishing, spamming, spoofing, spyware, Trojans and viruses;
Stolen hardware, such as laptops or mobile devices;
Denial-of-service and distributed denial-of-service attacks;
Breach of access;
Password sniffing;
System infiltration;
Website defacement;
Private and public Web browser exploits;
Instant messaging abuse; and
Intellectual property (IP) theft or unauthorized access.

As used and referenced herein, the term "contact" as relates to cyber-attacks includes, without limitation, a cyber-attack attempt that achieves a connection with a computing device of a computing environment or an asset of a computing environment.

As used and referenced herein, the term "harm" as relates to an enterprise computing environment includes, without limitation, physical damage, property theft, data loss and system disruption.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

Some embodiments of the present disclosure are directed to a technical problem regarding the reliability and certainty of data for frequency of cyber-attack attempts or threats against an asset in computers, computer networks, and/or an enterprise computing environment. The lack of reliable data regarding frequency of cyber-attack attempts, create uncertainty in allocation of resources for the enterprise computing environment to defend against a cyber-attack or a plurality of cyber-attacks. In some embodiments, the present disclosure has the technical solution, of at least, determining a cyber-attack type, monitoring cyber-attacks based on frequency and determining a numerical value for frequencies of cyber-attack attempts, monitoring a frequency of cyber-attack attempts that contact an enterprise computing environment of an enterprise and determining a numerical value for frequencies of cyber-attack attempts that make contact, or any combination thereof. In some embodiments, a "cyber-attack attempt" may be a plurality of attempts, and the plurality of cyber-attack attempts may be numerous attempts, for example, at least 100 (e.g., but not limited to, 100-999), at least 1,000 (e.g., but not limited to, 1,000-9, 999), at least 10,000 (e.g., but not limited to, 10,000-99, 999), at least 100,000. The numerous cyber-attack attempts may be concurrent numerous attacks. In some embodiments, the present disclosure has the technical solution of at least, calculating a half-life value of cyber-attacks attempts, wherein the half-life is the time it takes the value of cyber-attack attempts to decay or decrease by half.

Some embodiments of the present disclosure are directed to a technical problem of threat intelligence professionals dealing with multiple and sometimes confusing industry frameworks of cyber-attacks and cyber-attack types. In some embodiments, the present disclosure has the technical solution, of at least, categorizing the cyber-attack types from the multiple industry frameworks to a single consumable uniform data format. In some embodiments, the present disclosure has the technical solution of compiling a library of the cyber-attack types organized into the uniform data format.

FIGS. 1 through 6 illustrate systems and methods of quantification of a frequency over time of malicious actions or cyber-attacks against an asset in computers, computer networks, and an enterprise computing environment. The following embodiments provide technical solutions and/or technical improvements that overcome technical problems, drawbacks and/or deficiencies in the technical fields involving the quantification of frequency over time of cyber-attacks. As explained in more detail, below, technical solutions and/or technical improvements herein include aspects of improved automatic real-time assessment of cyber-attack frequencies, as well as merging of cyber-attacks from multiple frameworks of data values to a single consumable uniform data format.

In another set of technical solutions and/or technical improvements, explained in more detail below, includes aspects of presenting a visual cyber-attack representation of cyber-attacks and cyber-attack frequency values. The visual cyber-attack representation may include a visual mapping of the cyber-attacks, cyber-attack types, cyber-attack frequency by type and likelihood of cyber-attack frequency by type. Based on automatic assessments and mapping of these cyber-attacks to a simplified format, further technical benefits become available to users and operators of these systems and methods. The automatic assessments may be in real-time. Moreover, various practical applications of the present disclosure are also described, which provide further practical benefits to users and operators that are also new and useful improvements in the art.

FIG. 1 illustrates an example of an implementation of a cyber-attack frequency tracking system (hereinafter, cyber-attack FTS) for quantifying cyber-attack frequencies values, as well as, categorizing the cyber-attacks by types of attack in a uniform data format, according to an illustrative embodiment of the present disclosure. In some embodiments, a cyber-attack FTS 100 can include a communication bus 101, a database or storage device 103, a processor 115, a system memory 109, a cyber threat quantification engine 119, a network communication interface 111, an input device interface 121, and an output device interface such as, but not limited to, display device 113.

In some embodiments, the communication bus 101 collectively represents system, peripheral, and/or chipset buses that communicatively connect the numerous internal devices of the cyber-attack FTS 100. The communication bus 101 may be a physical interface for interconnecting the various components, however in some embodiments, the communication bus 101 may be a network interface, router, switch, or other communication interface.

As shown in FIG. 1, communication bus 101 can also couple the cyber-attack FTS 100 to a network (not shown) through a network communication interface 111. In this manner, the cyber-attack FTS system 100 can be part of a network of computers (for example a local area network ("LAN"), a wide area network ("WAN"), an Intranet, or a network of networks, for example, the Internet. Any or all components of the cyber-attack FTS 100 can be used in conjunction with the subject technology.

In some embodiments, the cyber-attack FTS 100 may receive and/or store multiple datasets or records, for example, datasets or records 105 and 107. Datasets or records 105 and 107 may include data values or data points associated with cyber-attacks, at every stage of attack, performed by one or more bad actors intending harm to the financial wellbeing of user and/or institutions' enterprise computing environment.

In some embodiments, the cyber-attack FTS 100 may include a processor 115 configured to perform instructions provided via the bus 101 by, e.g., accessing data stored in memory 109 via the communication bus 101. In some embodiments, a cyber threat quantification engine 119 includes a machine learning model. In some embodiments, a cyber threat quantification engine 119 includes a plurality machine learning models. In some embodiments, the machine learning model or the plurality of machine learning models may be an unsupervised machine learning model or a plurality of unsupervised machine learning models. In some embodiments, the machine learning model or the plurality of machine learning models is/are classification models, wherein the input may be the plurality of cyber-attack types and the output is classification into cyber-attack types.

In some embodiments, the machine learning model or plurality of machine learning models of the present disclosure may be configured to utilize one or more AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, a neutral network technique may be one of, without limitation, feedforward neural network, radial basis function network, recurrent neural network, convolutional network (e.g., U-net) or other suitable network.

In some embodiments and, optionally, in combination of any embodiment described above or below, a trained neural network model may specify a neural network by at least a neural network topology, a series of activation functions, and connection weights.

In some embodiments, Read-Only-Memory (ROM) (not shown) may be used and include a non-volatile storage device, such as, e.g., a magnetic disk hard drive, a solid-state drive, flash memory, or other non-volatile memory and combinations thereof. In some embodiments, system memory I 09 may include a volatile memory such as, e.g., random access memory (RAM) including dynamic RAM and/or static RAM, among other volatile memory devices and combinations thereof. In some embodiments, system memory I 09 may store data resulting from processing operations, a cache or buffer of data to be used for processing operations, operation logs, error logs, security reports, among other data related to the operation of cyber-attack FTS 100.

In some embodiments, a user or administrator may interact with the cyber-attack FTS 100 via a display device 113 and a user input device 121. The input device 121 may include, but is not limited to, e.g., a mouse, a keyboard, a touch panel of the display device 113, motion tracking and/or detecting, a microphone, an imaging device such as a digital camera, among other input devices. Results and statuses related to the cyber-attack FTS 100 and operation thereof may be displayed to the user as a visual cyber-attack representation via the display device 113.

Some examples of such results and statuses include summarized reports, a GUI showing types Tactics, Techniques and Procedures (TTP), information about frequency, information of likelihood into the future based on current data and trending, and other suitable results or statuses as shown in FIGS. 2-6.

In some embodiments, a server (not shown) can implement the database or storage device 103 discussed above with reference to FIG. 1. In some embodiments, a browser application of the present disclosure may be configured to receive and display graphics, text, multimedia, and the like, employing virtually any web based language, including, but not limited to, Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device of the cyber-attack FTS 100 may be specifically programmed by either Java, .Net, QT, C, C++ and/or other suitable programming language.

In some embodiments, a server may be a web server (or a series of servers) running a network operating system. In some embodiments, the server may be used for and/or provide cloud and/or network computing.

Figure 2:
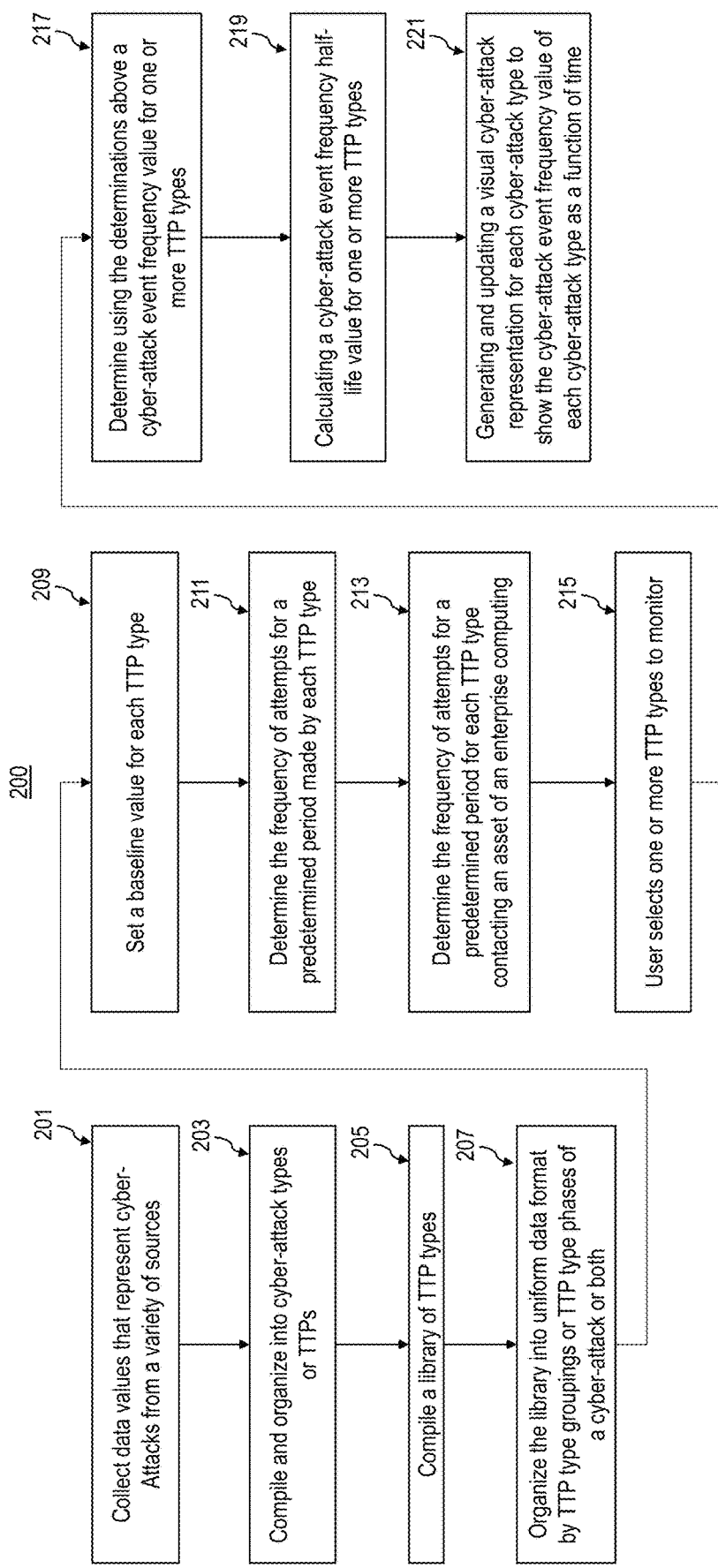

FIG. 2 illustrates an example of a flowchart of method 200 for using a cyber-attack FTS 100 as seen in FIG. 1, in accordance with one or more embodiments of the present disclosure. Method 200 may include collecting 201 data values in datasets 105 and 107 as seen in FIG. 1, from a variety of sources that deal with cyber-attacks which may include, at least partially, industry frameworks such as Common Attack Pattern Enumeration and Classification (CAPEC), Common Weakness Enumeration (CWE), Adversarial Tactics Techniques and Common Knowledge (ATT&CK), and/or Open Web Application Security Project (OWASP). Datasets or records 105 and 107 may include data values or data points associated with cyber-attacks. In some embodiments, the data values are of numerous attempts of a plurality of cyber-attacks. In some embodiments, threat intelligence professionals may also be used as a source for data values.

Method 200 may include compiling 203 data values into cyber-attack types also known as Tactics, Techniques and Procedures (TTP). These TTP types may include the following: signature spoof, input validation and representation, removable media, man in the middle, war driving and WIFI, drive by downloads, malicious email link, credential theft, open source item, social engineering, Application Programming Interface (API) abuse, brute force, compromised 3rd party networks, credential abuse, malware infrastructure vulnerability, infrastructure manipulation, network enumeration, open source intel, reverse engineering, input validation and representation, micro-configuration, Denial of Service "(D)DOS", sessions or communication hijacking, time and state, injection, unauthorized software installation, web app code defect, web app encapsulation, command and control, internal scanning, lateral movement persistence, privilege escalation, 3rd party breach, business and location availability, data destruction, data exfiltration, data extortion, data manipulation, fraud/cyber theft, IT systems availability (manmade), IT systems availability (natural disaster), website defacement, general hackers, nation state, hacktivists, malicious insider, and insider error.

Method 200 may include compiling or building 205 a library of TTP types. The library may be updated by a user's input or data values obtained from data values of industry frameworks. In some embodiments, the library will be automatically and continuously updated with TTP types by a machine learning model of the cyber-attack FTS. In some embodiments, the machine learning model may be an unsupervised machine learning model.

Method 200 may include transforming 207 data of each cyber-attack of the TTP types into a uniform data format in the library. In some embodiments, the TTP types are categorized into a uniform data format before placement into the library. In some embodiments, the cyber-attack FTS 100 may utilize a library of security and/or technology TTP types in one uniformed format containing a plurality of parent level TTP types. In some embodiments, the library may include one hundred or more security and/or technology TTP types in one uniformed format containing the plurality of parent level TTP types. In some embodiments, the library may include over five hundred or more security and/or technology TTP types in one uniformed format containing the plurality of parent level TTP types. In some embodiments, the plurality of parent level TTP types may include ten or more parent level TTP types. In some embodiments, the plurality of parent level TTP types may include fifty or more parent level TTP types. In some embodiments, the present disclosure merges and maps multiple external frameworks into a single uniform data format. In some embodiments, the uniform data format contain detail of TTP types and this uniform data format may be searchable.

In some embodiments of a cyber-attack FTS 100, these uniform data formats may organize and simplify the TTP types for easier analysis and visualization by threat intelligence professionals. The uniform data format may organize and simplify the TTP types that are received by the multiple industry frameworks that may each have their own diverse formats. Optionally, the TTP types are categorized into phases of how the cyber-attacks are typically conducted. For example, there may be phases named; Recon, Exploit, Propagate, and Harm. In some instances, the cyber-attack FTS organizes the TTP types by both uniform data format and phases.

The method 200 may include setting 209 a baseline cyber-attack event frequency value that is inherent to a TTP type. In some instances, setting of the baseline cyber-attack event frequency value may be input from a user or automatically determined by the cyber-attack FTS. In some embodiments, the setting of the baseline cyber-attack event frequency value may be a combination of user input and the cyber-attack FTS 100. In some embodiments, if a new TTP type becomes active, a baseline cyber-attack event frequency value may provide an input before sufficient data values of the TTP type become available.

Method 200 may include determining 1 a frequency of attempts of a plurality of TTPs of a TTP type over a time period or a predetermined time. In some embodiments, the determination may be done by receiving and totaling numeric representation of the frequency of attempts from multiple industry frameworks for a time period. In some embodiments, the determination of the frequency of attempts may be done by monitoring and totaling the number of attempts made in a time period.

Method 200 may include determining 213 a frequency of attempts a plurality of TTPs of a TTP type contacting an asset or computing device of an enterprise computing environment of an enterprise over a time period. In some embodiments, the determination may be done by receiving and totaling numeric representation of the frequency of attempts that contact an asset from multiple industry frameworks for a time period. In some embodiments, the determination of the frequency of attempts that contact an asset may be done by monitoring and totaling the number of attempts made in a time period.

Method 200 may include a user selecting 215 one or more TTP types to view and monitor.

Method 200 may include determining 217 from the frequency of attempts of the plurality of TTPs of a TTP type and from the frequency of attempt that contact an asset of the plurality of TTPs of a TTP type, a cyber-attack event frequency value for one or more TTP types. In some embodiments, the cyber-attack event frequency value may be calculated in the cyber threat quantification engine.

Method 200 may include calculating 219 a cyber-attack event frequency half-life value for one or more of the TTP types. In some embodiments, the cyber-attack FTS is continuously calculating the cyber-attack event frequency half-life value for one or more of the TTP types. In some embodiments, the cyber-attack FTS is calculating in real-time the cyber-attack event frequency half-life value for one or more of the TTP types.

Method 200 may include generating and updating 221 a visual cyber-attack representation for each cyber-attack type to show the cyber-attack event frequency value of each cyber-attack type as a function of time. In some embodiments, the cyber-attack FTS is continuously updating the visual cyber-attack representation. In some embodiments, the cyber-attack FTS is updating the visual cyber-attack representation in real-time. In some embodiments, the visual cyber-attack representation may be outputted to a display device.

In some embodiments of the present disclosure, the cyber-attack event frequency value may be used to calculate a residual cyber-attack event frequency value for a computing enterprise environment for a future time period. In some embodiments of the present disclosure, the cyber-attack event frequency value may be used to calculate a cyber-attack event frequency half-life value, wherein the cyber-attack event frequency half-life value is the time it takes the value of attempts of cyber-attacks to decay or decrease by half.

In some embodiments, the cyber-attack event frequency half-life value is used to allocate damage control and prevention resources in a computing enterprise environment accordingly. In some embodiments, the cyber-attack event frequency half-life value may be calculated in the cyber threat quantification engine.

In some embodiments, a cyber-attack FTS 100 of the present disclosure may be programmed to utilize a cyber-attack event frequency value to cause a performance of, or take a security activity. In some embodiments, a security activity may be, without limitation, an action taken against a cyber-attack that is preventative, remedial, defensive such that there would be no harm or the harm would be minimized.

Figure 3:
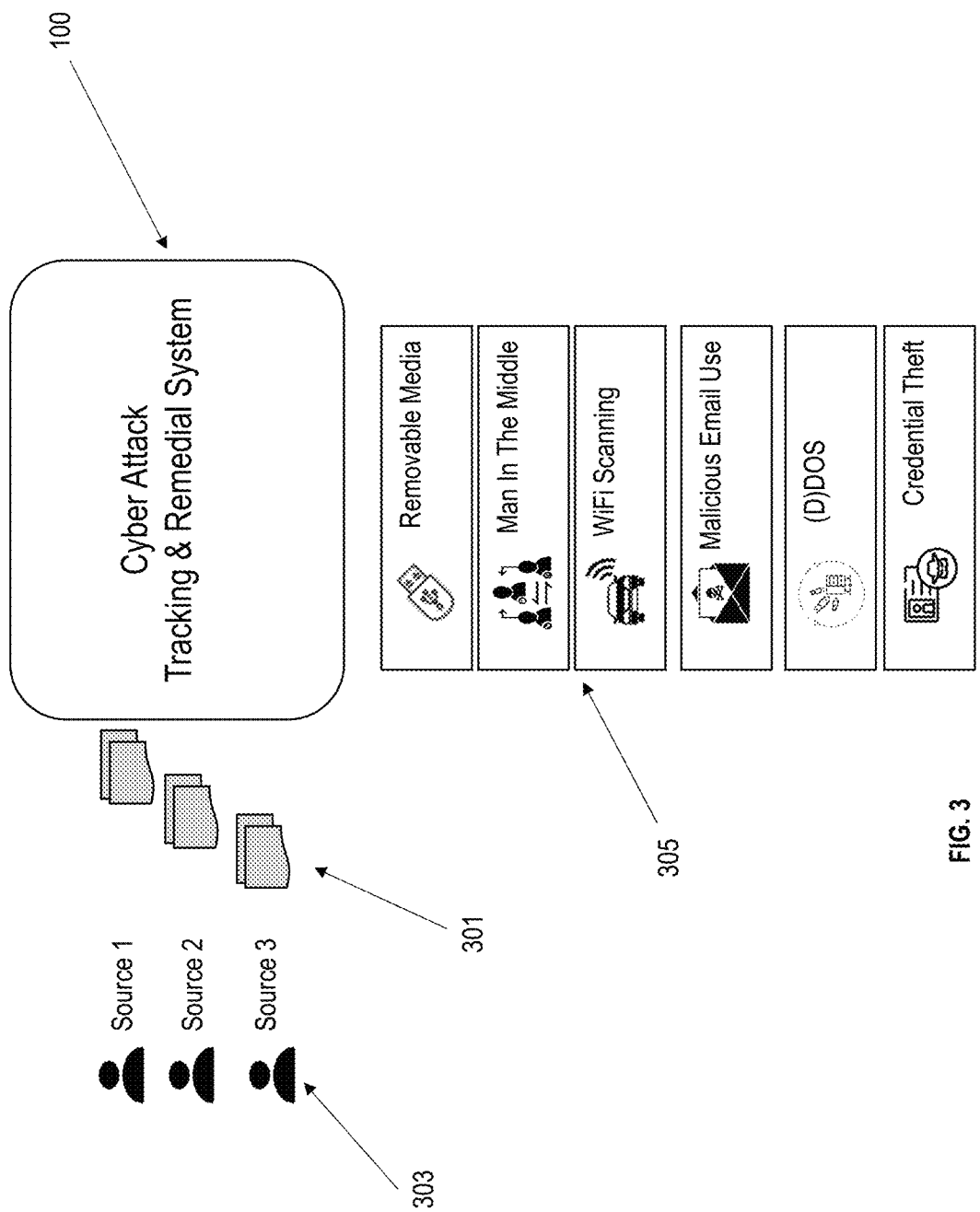

FIG. 3 is a schematic illustration of a process by which a cyber-attack FTS works to quantify and determine specific cyber-attack types, in accordance with at least some embodiments of the present disclosure. Multiple data values 301 are obtained from a plurality of sources 303 These data values may include, without limitation, data associated with cyber-attacks on an enterprise computer environment. In some embodiments, the cyber-attack FTS determines specific cyber-attack types represented by 305. The attack types may further contain a visual cyber-attack representation of the cyber-attack event frequency value. The cyber-attack FTS 100 may have a cyber threat quantification engine 119 (See FIG. 1) that is operable to automatically and dynamically determine, calculate, and aggregate the data values and/or likelihood values. The cyber threat quantification engine 119 may use proprietary algorithms to calculate successful attempt likelihood values and harm likelihood values.

The cyber-attack FTS 100 may further be operable to generate a visual representation and/or mapping of cyber-attack threat state, and/or likelihood of threat state of an enterprise computing environment organized by cyber-attack type. In some embodiments, cyber-attack FTS 100 may be configured to allow a user to select any cyber-attack type and to capture a window or point in time of the time period to further analyze and quantify those specific cyber-attack types frequency.

In some embodiments, cyber-attack FTS may be configured to allow a user to select any cyber-attack type to capture a window in time of the time period to further analyze a successful attempt likelihood for specific cyber-attack types as well as a half-life that represents a potential decay over time. In some embodiments, cyber-attack FTS may be configured to allow a user to select any cyber-attack type to capture a window in time of the time period to further analyze a harm likelihood for specific cyber-attack types as well as a half-life that represents a potential decay over time.

Figure 4:
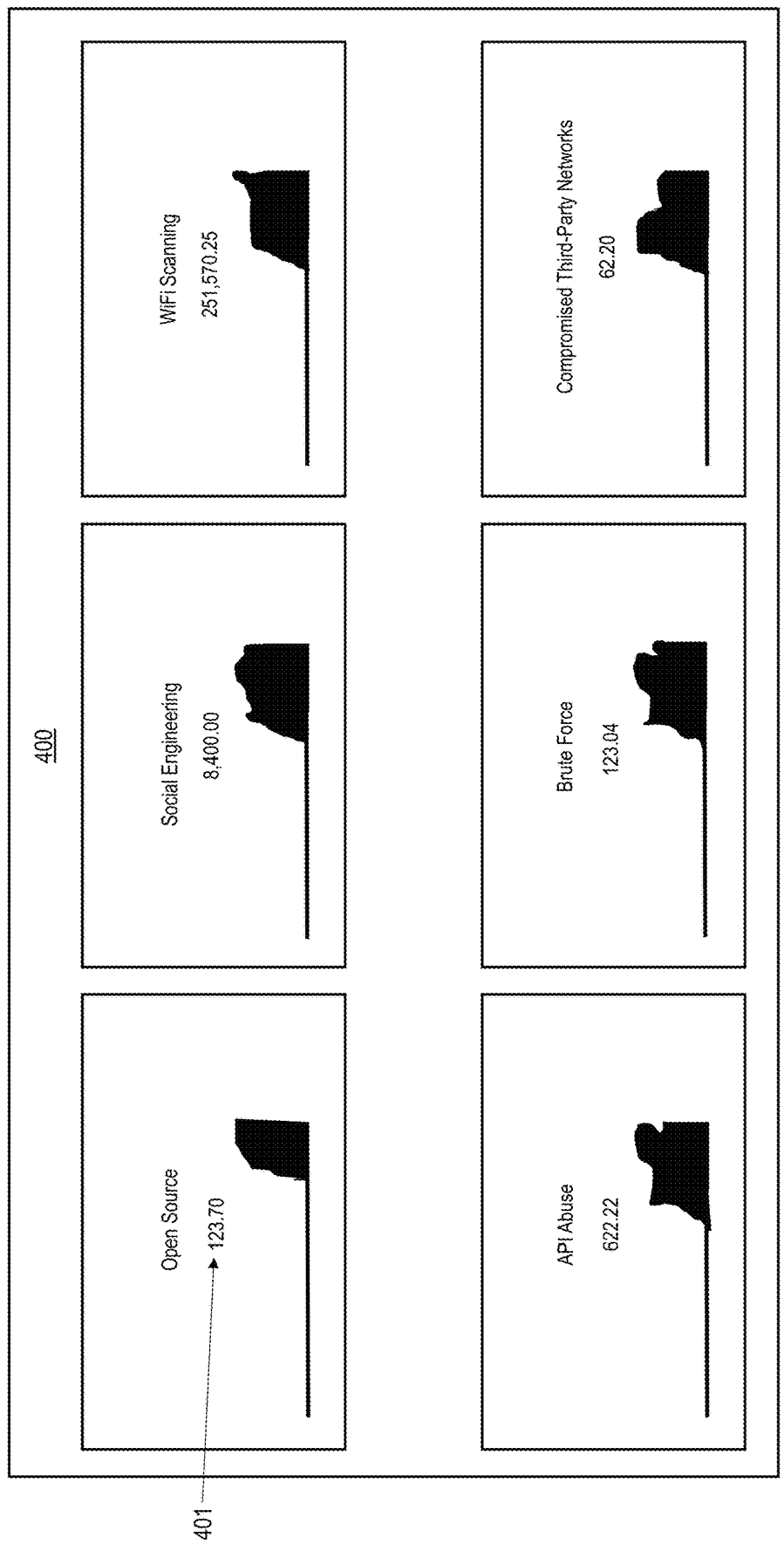
Figure 5:
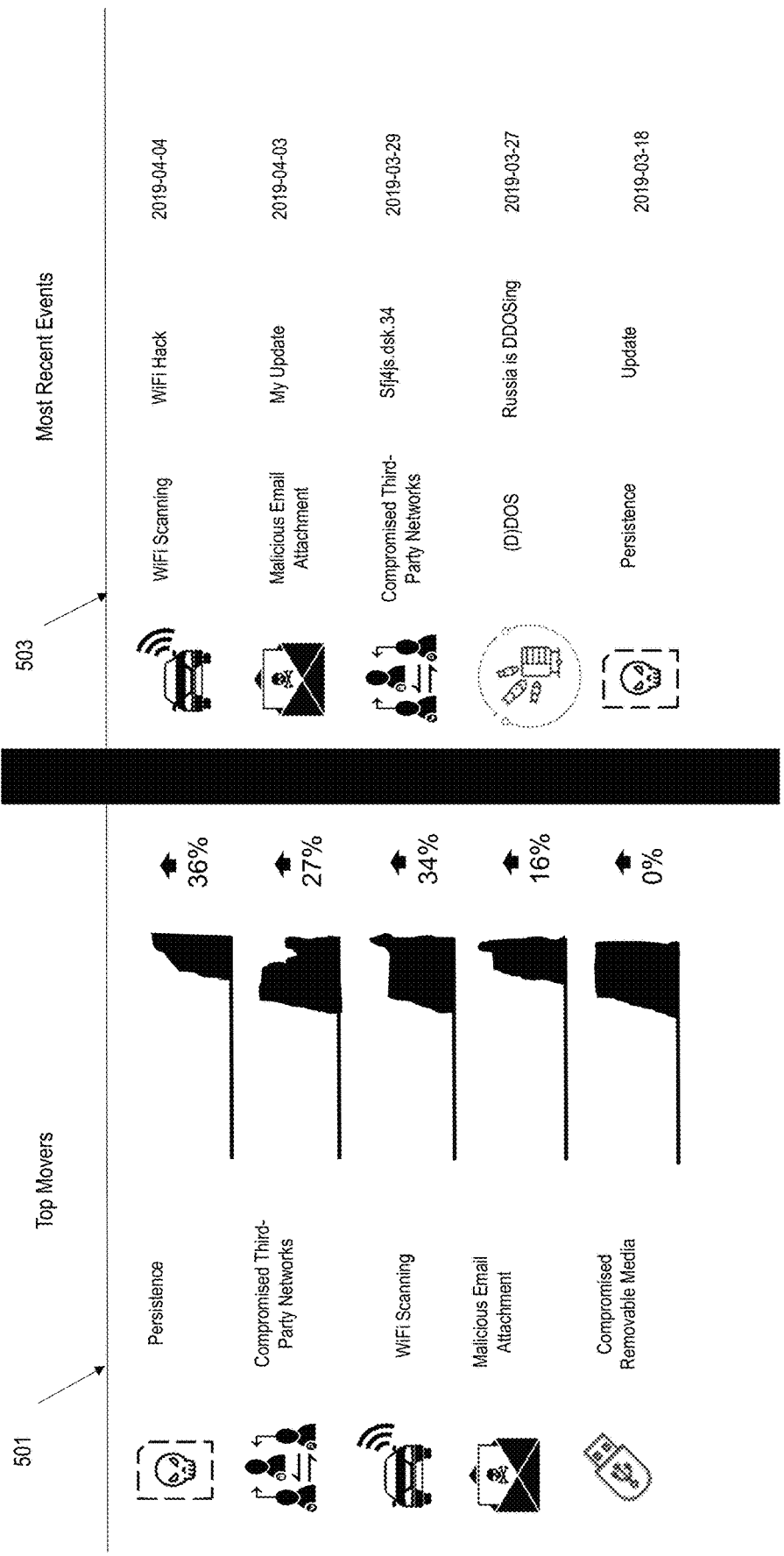
Figure 6:
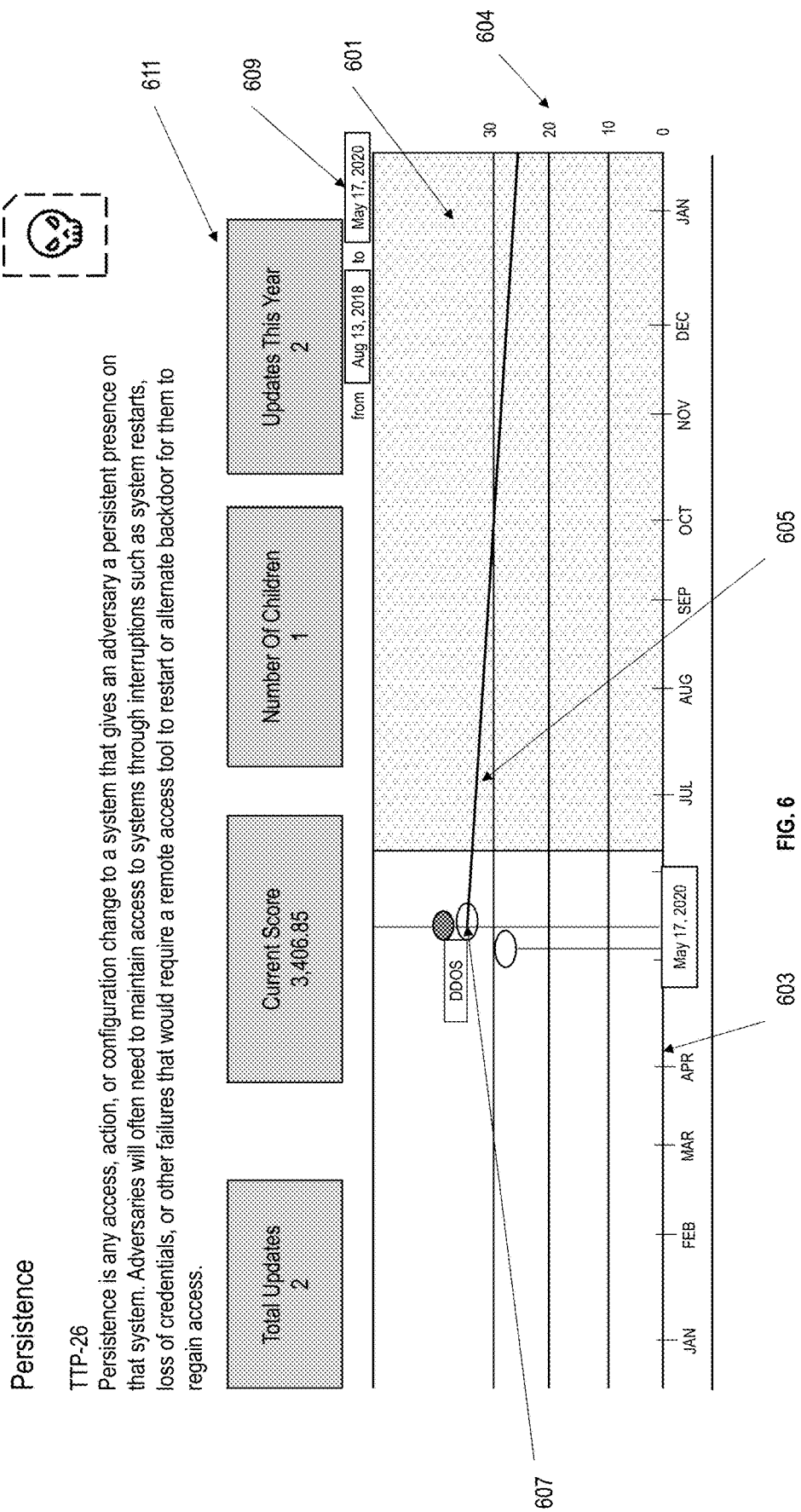

In some embodiments, as illustrated in FIGS. 4-6, a cyber-attack FTS 100 generates a visual cyber-attack representation of cyber-attack types for a display device. FIG. 4 is an illustration of an example of a visual cyber-attack representation 400 for an output display in accordance with at least some embodiments of the current disclosure. The visual cyber-attack representation 400 may be displayed on a display device 113, as seen in FIG. 1. In some embodiments, the visual cyber-attack representation details different cyber-attack types in different dialogue boxes and this facilitates the user and/or administrator to visualize, in real-time, a current cyber-attack threat frequency state of an enterprise computing environment. In some embodiment, the visual cyber-attack representation details a likelihood of a cyber-attack, of an enterprise computing environment. The bottom of each dialogue box may have a graph to illustrate the frequencies of each cyber-attack type. Each of the dialogue boxes may also have one or more numeric values 401. In some embodiments, a numeric value 401, by way of example, may be the number of times on an annual basis that cyber-attacks of a cyber-attack type are expected to occur, succeed and/or cause harm. In some embodiments, the numericZ value 401 is the cyber-attack event frequency value.

FIG. 5 is an illustration, by way of example, of a visual cyber-attack representation generated by the cyber-attack FTS of some embodiments of the current disclosure. Dialogue box 501 illustrates a few cyber-attack types that are organized by the increase or decrease in frequency of usage of the cyber-attack type. Dialogue box 503 illustrates a few cyber-attack types visually represented by how recent these cyber-attack types were at least attempted to be used.

In some embodiments, a display device 113 and an input device 121, as seen in FIG. 1, are used in combination and are operable for a user to manipulate cyber-attack related data values and/or data organization/presentation within a GUI (e.g., FIG. 6). FIG. 6 illustrates a visual cyber-attack representation (e.g., dashboard) of a detail page for a single cyber-attack type in accordance with at least some embodiments of the present disclosure. In some embodiments, the user may filter data elements of the visual cyber-attack representation.

In the visual cyber-attack representation of FIG. 6, there may be a graph 601 for each cyber-attack type that would be similar to FIG. 4, and be configured to be programmed to allow for user interaction. In some embodiments, the graph 601 has a portion representing a future time period, which may be based on current data, half-life values, decay values and/or trending. In some embodiments of the present disclosure, the cyber-attack event frequency value is represented. In some embodiments, and as seen in FIG. 6, the visual cyber-attack representation is of the cyber-attack event frequency as a function of time. The function of time is shown in FIG. 6 as a reference date line 603 on the X axis located across the bottom of graph 601. In some embodiments, the cyber-attack event frequency value 604 is located on the Y axis. In some embodiments, the Y axis represents the cyber-attack frequency half-life value. In some embodiments, the visual cyber-attack representation is of the cyber-attack event frequency as a function of time for each of a plurality of the cyber-attack types. In some embodiments, the visual cyber-attack representation is of the cyber-attack event frequency as a function of time for each of a plurality of the cyber-attack types and the visual cyber-attack representation is categorized by the cyber-attack type.

In some embodiments, the visual cyber-attack representation (e.g., dashboard) of FIG. 6 may be programmed to allow the user to use, for example, a slide feature to investigate data and frequency data for a specific cyber-attack in a window of time on a timeline 605 that is a visual cyber-attack representation of the cyber-attack event frequency as a function of time. The slide feature may be a program that allows the visual cyber-attack representation to be interactive for a user and that may be GUIs. In some embodiments, the slide feature program allows the user to choose a specific point 607 on the timeline 605 to obtain details about the cyber-attack threat state, and/or the likelihood of threat state of cyber-attack(s) of a particular cyber-attack type. In some embodiments of the present disclosure, a program may allow a user to request a window of time 609, that may be a date range, in a time period to display on the graph 601.

The visual cyber-attack representation of FIG. 6, by way of example, may be of the cyber-attack type or TTP type of "Persistence" with the TTP type and definition thereof also displayed in FIG. 6. The definition of persistence may be, "any access, action, or configuration change to a system that gives an adversary a persistent presence on that system. Adversaries will often need to maintain access to systems through interruptions such as system restarts, loss of credentials or other failures that would require a remote access tool to restart or alternate back door for them to regain access." In some embodiments of the present disclosure, the visual cyber-attack representation of FIG. 6 may display various numeric values 611 associated with a specific cyber-attack type or TTP type. For example, a number of children of a TTP type may be displayed illustrating the relationships between TTP types in a uniform data format that represents one option for the uniform data format organization of the current disclosure. In some embodiments, the current score box is the numeric value at present in real time of the cyber-attack event frequency value for the specific example of "Persistence."

In some embodiments, a user may choose to filter a visual cyber-attack representation of a cyber-attack likelihood threat state and/or threat state of an enterprise computing environment based on different data elements. In some instances, a program may allow a user to input datasets that update data in cyber-attack types or create more cyber-attack types through an input device In some embodiments, a program allows inputted datasets from a user to override the determinations made by the cyber-attack FTS.

Figure 7:
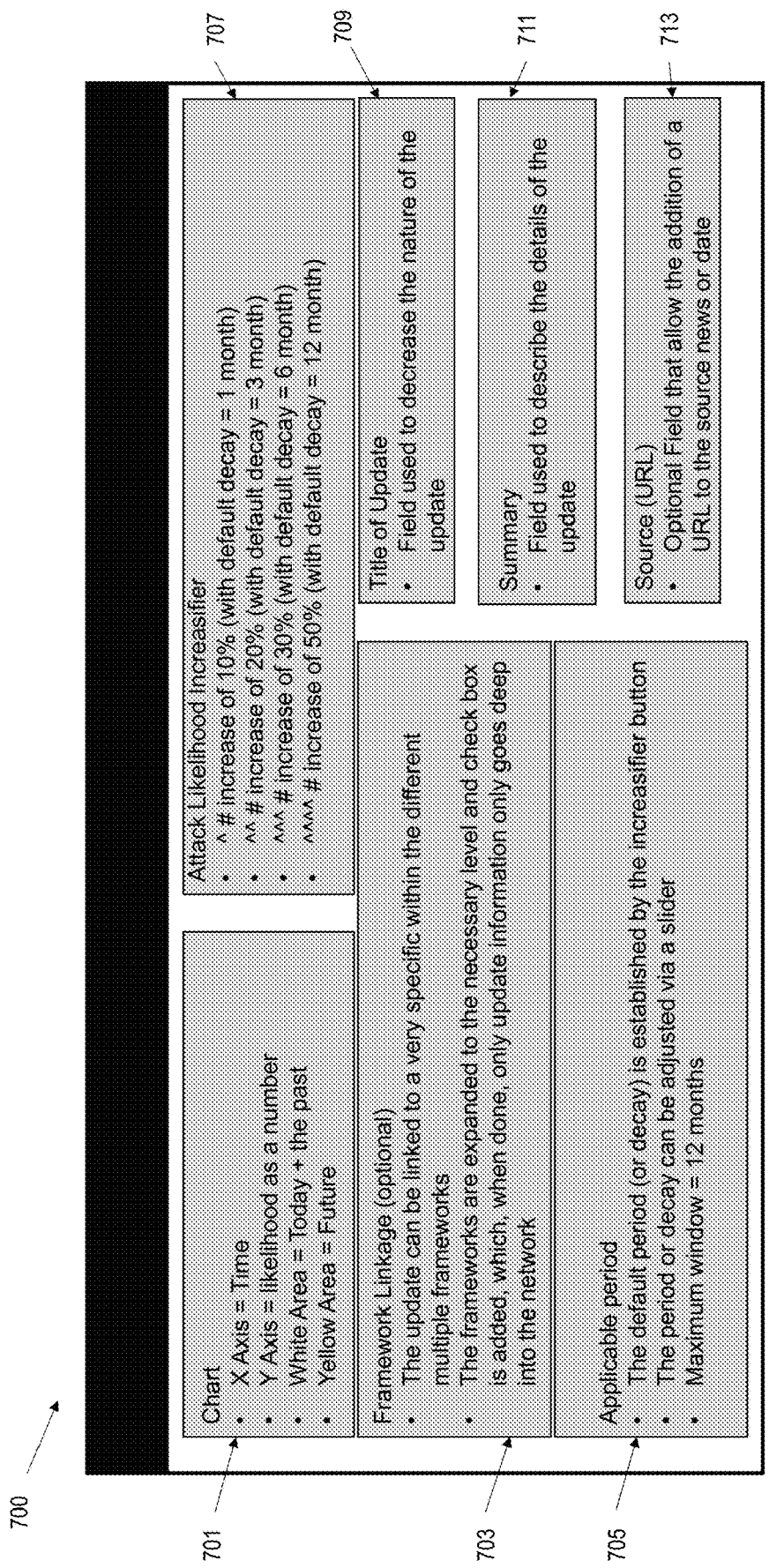

FIG. 7 is a description of detailed functionality of the visual cyber-attack representation of FIG. 6. In some embodiments, description 700 may provide more information of the visual cyber-attack representation of graph 601. In some embodiments, graph 601 according to block 701 may have an X axis for time, and a Y axis for frequency of cyber-attack attempts, frequency of cyber-attack contacts as a value or number, or any combination thereof. In some embodiments, graph 601 according to block 701 may have an X axis for time and a Y axis for frequency of cyber-attack attempts, frequency of cyber-attack attempts that contact an asset, or any combination thereof.

Further, in some embodiments, graph 601 may have one color or shade area, for example white, that represents today and the past. In some embodiments, graph 601 may have a different shade or color area, for example yellow, representing the future also seen in 701. In some embodiments, and as noted in block 703, cyber-attack FTS 100 may have optional linkage with different industry frameworks. For example, an update of a TTP or TTP type may be linked to an industry framework. In some embodiments, as shown in block 705, the program for the slide feature noted in FIG. 6, may adjust the period or decay of a cyber-attack event frequency value of a TTP type.

In some embodiments, a program may allow the user to increase the likelihood of attack in FIG. 6, as noted in block 707 where the likelihood of attack increasifiers are detailed. In some embodiments, a program may allow the title of the TTP type to be updated by the user as shown in block 709. Similarly, a program may allow the TTP type details, in some embodiments, to be added to the description by the user, as shown in block 711. In some embodiments, a program may allow a user to add a source U to a TTP type, as shown in block 713.

In some embodiments, software specifically programmed in accordance with one or more principles of the present disclosure may be downloadable from a network, for example, a website, as a stand-alone product or as an add-in package for installation in an existing software application For example, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As used herein, the term "user" shall refer to at least one user. In some embodiments, the term "user" should be understood to refer to a provider of an application or applications as described herein and/or a consumer of data supplied by a data provider. By way of example, and not limitation, the terms "user" or "developer" can refer to a person who receives data provided by the data or service provider over the Internet in a browser session, or can refer to an automated software application which receives the data and stores or processes the data.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, programmed computing systems with associated devices can be configured to operate in the distributed network environment, communicating with one another over one or more suitable data communication networks (e.g., the Internet, satellite, etc.) and utilizing one or more suitable data communication protocols.

As used herein, the terms "computer engine" and "engine" identify at least one software component and/or a combination of at least one software component and at least one hardware component designed/programmed/configured to interact with other software and/or hardware components and/or compute system outputs.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers can be, for example, a collection of servers serving one or more functions of a single server.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms.

In some embodiments, computer-based systems of the present disclosure may be configured to utilize hardwired circuitry and/or hardware components that may be used in place of or in combination with software instructions to implement features consistent with principles of the disclosure. Thus, implementations consistent with principles of the disclosure are not limited to any specific combination of hardware circuitry or hardware components and/or software.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

The aforementioned examples are, of course, illustrative and not restrictive. At least some aspects of the present disclosure will now be described with reference to the following numbered clauses.

What is claimed is:

1. A computer-implemented method, comprising:
    determining, based on information received from a computing device that indicates cyber-attacks against the computing device, a type of cyber-attack, a frequency of the cyber-attack during a first time period, and a frequency of success of the cyber-attack against the computing device during the first time period;
    determining, based at least in part on the type of the cyber-attack, the frequency of the cyber-attack, and the frequency of success of the cyber-attack, a cyber-attack event frequency value indicative of a likelihood the type of the cyber-attack will occur against the computing device during a second time period;
    determining a half-life value that indicates an amount of time for the cyber-attack event frequency value to decrease by a half; and
    causing display of an indication of the type of the cyber-attack and the half-life value as a function of time over the second time period.

2. The computer-implemented method of claim 1, wherein the determining the type of the cyber-attack further comprises:
    inputting, to a predictive model trained to forecast cyber-attack types based on data values received from computing devices, the information that indicates cyber-attacks against the computing device; and
    receiving, from the predictive model, an indication of the type of the cyber-attack.

3. The computer-implemented method of claim 1, further comprising causing, based on a request to capture a window of time of the second time period, display of the indication of the type of the cyber-attack and the half-life value as a function of time during the window of time of the second time period.

4. The computer-implemented method of claim 1, further comprising:
    modifying, based on a request from a user device, a dataset for the type of the cyber-attack; and
    causing, based on the modified dataset, display of an indication of a different type of the cyber-attack.

5. The computer-implemented method of claim 1, wherein the information received from the computing device that indicates cyber-attacks against the computing device is in a format associated with the computing device, the method further comprising:
    determining, based on information received from another computing device that indicates cyber-attacks against the another computing device, another type of cyber-attack, wherein the information from the another computing device is in a format associated with the another computing device;
    transforming the information received from the computing device and the information received from the another computing device, into a common format; and
    storing an indication of the type of the cyber-attack and an indication of the another type of cyber-attack in the common format.

6. The computer-implemented method of claim 1, further comprising sending, to the computing device, an instruction to remediate the cyber-attack type.

7. The computer-implemented method of claim 1, further comprising updating, based on additional information received from the computing device that indicates cyber-attacks against the computing device, the half-life value.

8. A system comprising: a memory; and
    at least one processor coupled to the memory and configured to perform operations comprising:
        determining, based on information received from a computing device that indicates cyber-attacks against the computing device, a type of cyber-attack, a frequency of the cyber-attack during a first time period, and a frequency of success of the cyber-attack against the computing device during the first time period;
        determining, based at least in part on the type of the cyber-attack, the frequency of the cyber-attack, and the frequency of success of the cyber-attack, a cyber-attack event frequency value indicative of a likelihood the type of the cyber-attack will occur against the computing device during a second time period;
        determining a half-life value that indicates an amount of time for the cyber-attack event frequency value to decrease by a half; and
    causing display of an indication of the type of the cyber-attack and the half-life value as a function of time over the second time period.

9. The system of claim 8, wherein the determining the type of the cyber-attack further comprises:
    inputting, to a predictive model trained to forecast cyber-attack types based on data values received from computing devices, the information that indicates cyber-attacks against the computing device; and receiving, from the predictive model, an indication of the type of the cyber-attack.

10. The system of claim 8, the operations further comprising causing, based on a request to capture a window of time of the second time period, display of the indication of the type of the cyber-attack and the half-life value as a function of time during the window of time of the second time period.

11. The system of claim 8, the operations further comprising:
    modifying, based on a request from a user device, a dataset for the type of the cyber-attack; and
    causing, based on the modified dataset, display of an indication of a different type of cyber-attack.

12. The system of claim 8, wherein the information received from the computing device that indicates cyber-attacks against the computing device is in a format associated with the computing device, the operations further comprising:
    determining, based on information received from another computing device that indicates cyber-attacks against the another computing device, another type of cyber-attack, wherein the information from the another computing device is in a format associated with the another computing device;
    transforming the information received from the computing device and the information received from the another computing device, into a common format; and
    storing an indication of the type of the cyber-attack and an indication of the another type of cyber-attack in the common format.

13. The system of claim 8, the operations further comprising sending, to the computing device, an instruction to remediate the type of the cyber-attack.

14. The system of claim 8, the operations further comprising updating, based on additional information received from the computing device that indicates cyber-attacks against the computing device, the half-life value.

15. A non-transitory computer-readable medium having instructions stored thereon that, when executed by at least one computing device, cause the at least one computing device to perform operations comprising:
    determining, based on information received from a computing device that indicates cyber-attacks against the computing device, a type of cyber-attack, a frequency of the cyber-attack during a first time period, and a frequency of success of the cyber-attack against the computing device during the first time period;
    determining, based at least in part on the type of the cyber-attack, the frequency of the cyber-attack, and the frequency of success of the cyber-attack, a cyber-attack event frequency value indicative of a likelihood the type of the cyber-attack will occur against the computing device during a second time period;
    determining a half-life value that indicates an amount of time for the cyber-attack event frequency value to decrease by a half; and
    causing display of an indication of the type of cyber-attack and the half-life value as a function of time over the second time period.

16. The non-transitory computer-readable medium of claim 15, wherein the determining the type of the cyber-attack further comprises:
    inputting, to a predictive model trained to forecast cyber-attack types based on data values received from computing devices, the information that indicates cyber-attacks against the computing device; and
    receiving, from the predictive model, an indication of the type of the cyber-attack.

17. The non-transitory computer-readable medium of claim 15, the operations further comprising causing, based on a request to capture a window of time of the second time period, display of the indication of the type of the cyber-attack and the half-life value as a function of time during the window of time of the second time period.

18. The non-transitory computer-readable medium of claim 15, the operations further comprising:
    modifying, based on a request from a user device, a dataset for the type of cyber-attack; and
    causing, based on the modified dataset, display of an indication of a different type of cyber-attack.

19. The non-transitory computer-readable medium of claim 15, wherein the information received from the computing device that indicates cyber-attacks against the computing device is in a format associated with the computing device, the operations further comprising:
    determining, based on information received from another computing device that indicates cyber-attacks against the another computing device, another type of cyber-attack, wherein the information from the another computing device is in a format associated with the another computing device;
    transforming the information received from the computing device and the information received from the another computing device, into a common format; and
    storing an indication of the type of the cyber-attack and an indication of the another type of cyber-attack in the common format.

20. The non-transitory computer-readable medium of claim 15, the operations further comprising sending, to the computing device, an instruction to remediate the type of the cyber-attack.

* * * * *